United States Patent [19]

Kinley et al.

[11] 4,320,579
[45] Mar. 23, 1982

[54] CALIPERING TOOL

[75] Inventors: John C. Kinley; Harry E. Dieckman, both of Houston; Clifford E. Anderson, Huntsville, all of Tex.

[73] Assignee: J. C. Kinley Company, Houston, Tex.

[21] Appl. No.: 116,610

[22] Filed: Jan. 29, 1980

Related U.S. Application Data

[63] Continuation-in-part of Ser. No. 108,388, Dec. 31, 1979.

[51] Int. Cl.³ .............................. G01B 5/12; G01B 5/28
[52] U.S. Cl. .............................. 33/178 R; 33/178 E; 33/178 F
[58] Field of Search ............ 33/178 R, 178 F, 178 E, 33/143 R, 147 K

[56] References Cited

U.S. PATENT DOCUMENTS

| | | | |
|---|---|---|---|
| 2,637,117 | 5/1953 | Fredd | 33/178 F |
| 2,695,458 | 11/1954 | Fredd | 33/178 F |
| 2,699,001 | 1/1955 | McMahan | 33/178 F |
| 2,777,746 | 1/1957 | Fredd | 33/178 F |
| 2,794,260 | 6/1957 | Kinley | 33/178 F |
| 2,947,086 | 8/1960 | Boyle | 33/178 F |
| 3,061,938 | 11/1962 | Anderson et al. | 33/178 F |
| 3,333,466 | 8/1967 | Oliver | 33/178 F |
| 3,474,541 | 10/1969 | Cubberly, Jr. | 33/178 F |
| 4,227,309 | 10/1980 | Jones | 33/178 F |
| 4,247,985 | 2/1981 | Boyle | 33/178 F |

Primary Examiner—Willis Little
Attorney, Agent, or Firm—Pravel, Gambrell, Hewitt, Kirk, Kimball & Dodge

[57] ABSTRACT

A calipering tool for use in a pipe and having a body and feeler means mounted with the body for engaging the surfaces of the pipe being calipered and with feelers moving in response to variations in the surface of the pipe, the improvement residing in mechanisms with the body for permitting the body of the calipering tool to be pumped in response to fluid pressure thereon into and out of the pipe for operation of the calipering tool.

33 Claims, 16 Drawing Figures

Fig. 2I   Fig. 2J

CALIPERING TOOL

CROSS REFERENCE TO RELATED APPLICATIONS

This application is a continuation-in-part of Ser. No. 108,388, filed Dec. 31, 1979.

TECHNICAL FIELD OF THE INVENTION

The field of this invention relates to calipering tools, and particularly to pipe calipering tools for indicating surface variations of the internal surface of a pipe or tubular member.

PRIOR ART

Well calipers for locating corrosion pits and other internal defects in well tubing and pipes are well known as is shown in U.S. Pat. No. 3,061,938. However, so far as known, all such calipering tools are positioned within a well bore by utilization of a wire line connected with the calipering tool for raising and lowering such calipering tools out of and into a tubular member that is to be calipered. Furthermore, so far as known, such calipering tools may only be used within tubular members that are substantially elongate, having no curved or looped portions. Such prior art calipering tools tend to be rather lengthy, thus being unable to press through any bends and/or curves that exist within the tubular member. Thus, such calipering tools have not been able to be used effectively for calipering the inside surface of tubular members having bends and/or curves along a portion thereof. Such tools must necessarily be positioned such that they run substantially along and parallel with a substantially elongate tubular member.

Furthermore, prior art devices require removal and replacement of the entire calipering tool in order to effectuate or repair the active components of such a calipering tool upon breakdown thereof. In such a case, the calipering tool would necessitate removal from the wireline and replacement with a complete second calipering tool in order to remain in operation, a procedure that is costly and inefficient.

SUMMARY OF THE INVENTION

It is an object of the present invention to provide a new and useful calipering tool capable of being pumped down into a tubular member and appropriately positioned without the use of a wireline and capable of providing component service assemblies for ease in maintenance, adjustments and operations thereof.

The calipering tool of the present invention is used in a pipe and has a body and feeler means therewith for engaging the surface of the pipe being calipered. The feeler means move in response to variations in the inner surface of the pipe with the improvement of the present invention residing in the means with the body for permitting the body to be pumped in response to fluid pressure thereon into the pipe for operation of the calipering tool.

It should be understood that this description of the invention is not intended to be limiting but only exemplary of the many patentable features of this invention, which are set forth in the claims.

DESCRIPTION OF THE DRAWINGS

FIG. 3 is an enlarged, sectional side view of the calipering tool of the present invention taken along the lines 3—3 of FIG. 2H;

FIG. 4 is a sectional plan view taken along the lines 4—4 of FIG. 2H and FIG. 3 of the calipering tool of the present invention;

FIG. 5 is a sectional plan view taken along the lines 5—5 of FIG. 2H showing the drive wheel assembly of the calipering tool of the present invention; and, FIG. 6 is an enlarged sectional view of the lower portion of the transmitting arm of the present invention.

DESCRIPTION OF THE PREFERRED EMBODIMENT

Figure 1:
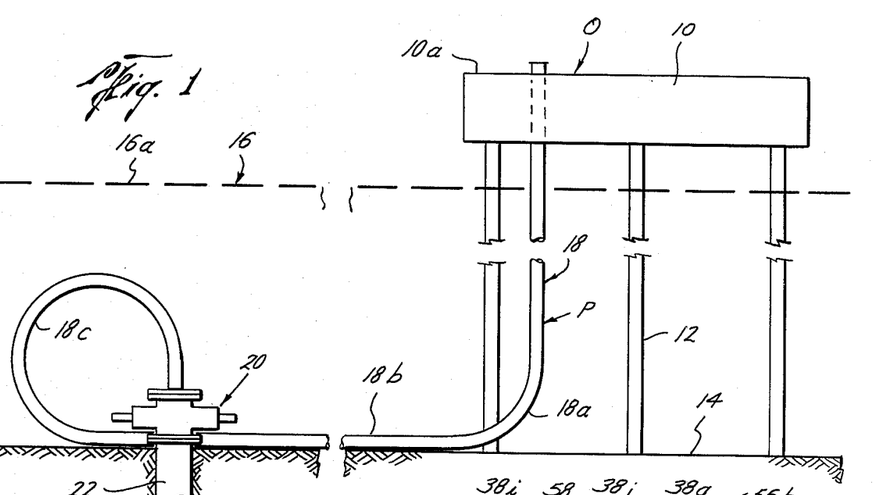
FIG. 1 is a schematic elevational view of an offshore platform having a tubular member extending therefrom that has a curved and looped portion and capable of receiving the calipering tool of the present invention.

In the drawings, the letter C designates generally the calipering tool of the present invention which is adapted to be positioned within well tubing or other pipe P which may extend from an offshore platform O. Typically, an offshore platform O includes a platform 10 (FIG. 1) having platform supports 12 extending downwardly therefrom and positioned on the floor 14 of the reservoir 16 which may be an ocean, lake, or any other type of body of water. Typically, the well tubing or pipe P which includes tubular member 18 extends from the upper surface 10a of the platform 10, downwardly through the platform 10, beneath the surface 16a of the reservoir 16 adjacent to the floor 14 wherein the tubular member may be curved adjacent section 18a. Thereafter the tubular member 18 may extend along and adjacent to the floor 14 of the reservoir 16 at section 18b whereinafter the tubular member 18 may have a looped section 18c which may be affixed to an appropriate subsurface valving arrangement designated generally as 20. The tubular member 18 thereafter extends downwardly from the subsurface valving arrangement 20 to a substantially vertical section 18d which may be disposed within casing 22 which is positioned within borehole 24. The calipering tool C of the present invention is adapted to be pumped down and through the well tubing or pipe P through sections 18a, 18b, 18c, 18d by means of fluid pressure as discussed more fully hereinbelow, without the need or utilization of any type of wireline apparatus.

Figure 2A:
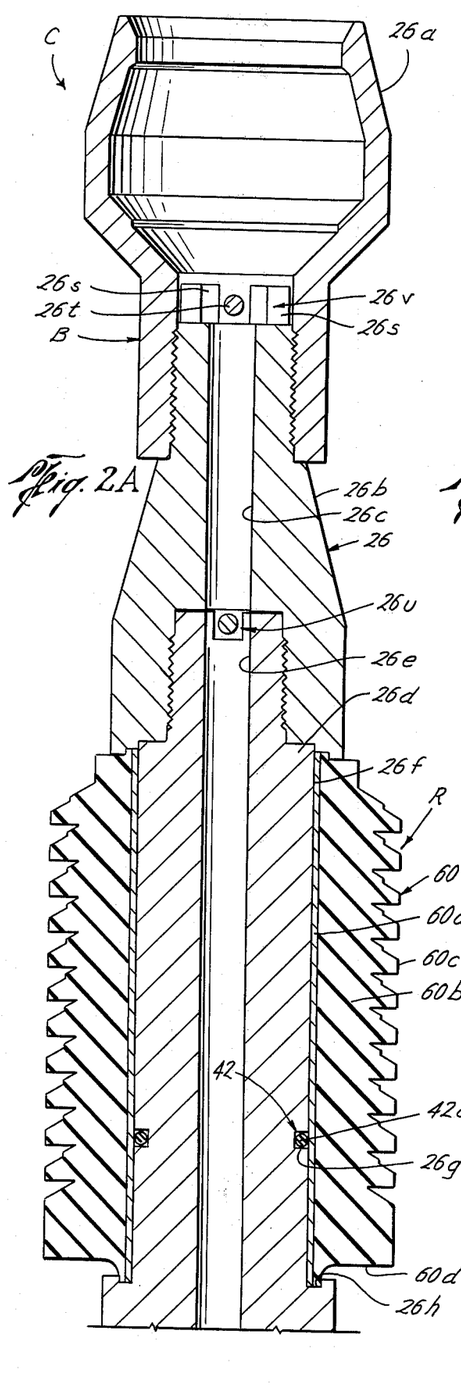
FIGS. 2A-2K are vertical, sectional elevational views, illustrating in detail the calipering tool of the present invention, beginning with the upper end thereof in FIG. 2A to the lower end thereof, as shown in FIG. 2K, respectively.

The calipering tool C of the present invention includes a body B having feeler means F therewith. The feeler means F engage the surface of the well tubing or pipe P for moving in response to variations in inner annular surface of the pipe P. The body B includes a plurality of body sections designated generally as body sections 26, 28, 30, 32, 34, 36, 38 (FIGS. 2A-2K) that extend from the uppermost portion of the calipering tool C to the lowermost portion. As shown in FIG. 2A, body section 26 includes a fishing neck 26a that is threadedly affixed with an appropriate adapter section 26b, with the adapter section 26b being formed having a bore 26c therein. A suitable locking means designated generally as 26r prevents unwanted unthreading of neck 26a and section 26b. The locking means 26r includes tabs 26s formed with section 26b which is adapted to receive pin 26t which extends through openings (not shown) formed in neck 26a and therebetween the tabs 26s to prevent rotation between neck 26a and section 26b.

A locomotive section 26d is threadedly affixed with the adapter section with the locomotive section having a bore 26e formed therein and in axial alignment with bore 26c. A locking means 26u similar to 26r prevents unwanted rotation between locomotive section 26d and adapter section 26b. The locomotive section 26d is formed having an outer surface 26f having a suitable detent 26g formed therein for receiving a suitable seal 42, such as O-ring 42a. A radial lip 26h is formed adjacent the lower end of outer surface 26f. An enlarged bore 26i is formed adjacent the lower end of the locomotive section 26d in axial alignment with bore 26e, with the locomotive section 26d being threadedly affixed with the connector portion 26j. Locking means 26v like 26r and 26u, prevents unthreading rotation between the locomotive section 26d and connector portion 26j. The connector portion 26j is formed having a neck 26k and a ball 26l therewith.

Figure 2B:
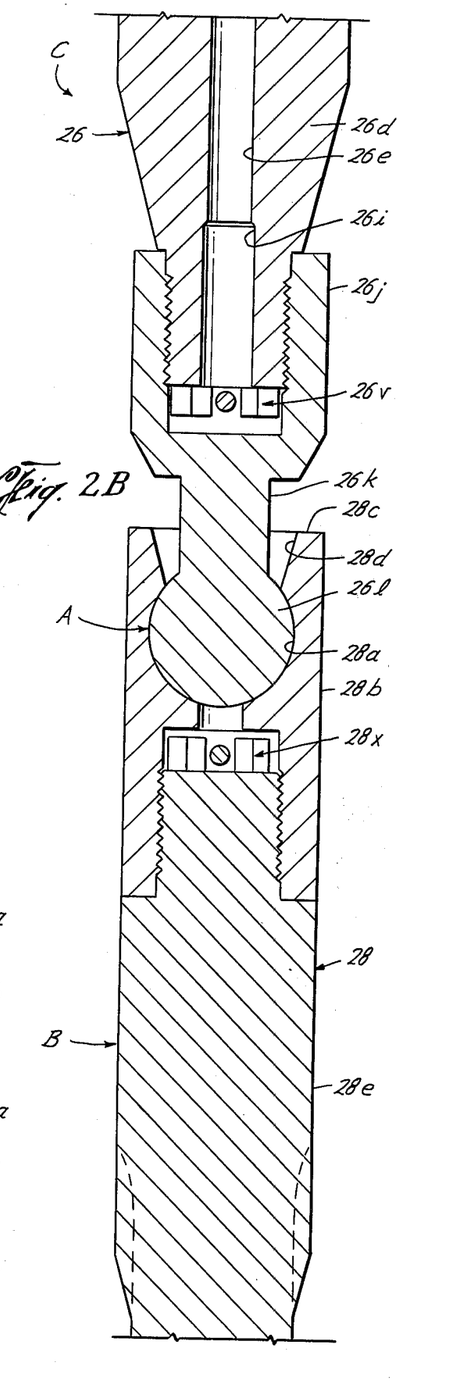

The body section 28 adjoins body section 26 by means of socket 28a formed in socket portion 28b receiving the ball 26l of body section 26. Preferably, the socket 28a is displaced from the upper end 28c of the body section 28 and separated therefrom by conic annular surface 28d which is adapted to receive the neck 26k of the connector portion 26j of body section 26. As such, the ball 26l may rotate and/or turn within the socket 28a subject to the constraints of the neck 26k contacting the conic annular surface 28d, thus forming an articulating connection between body sections 26, 28.

Figure 2C:
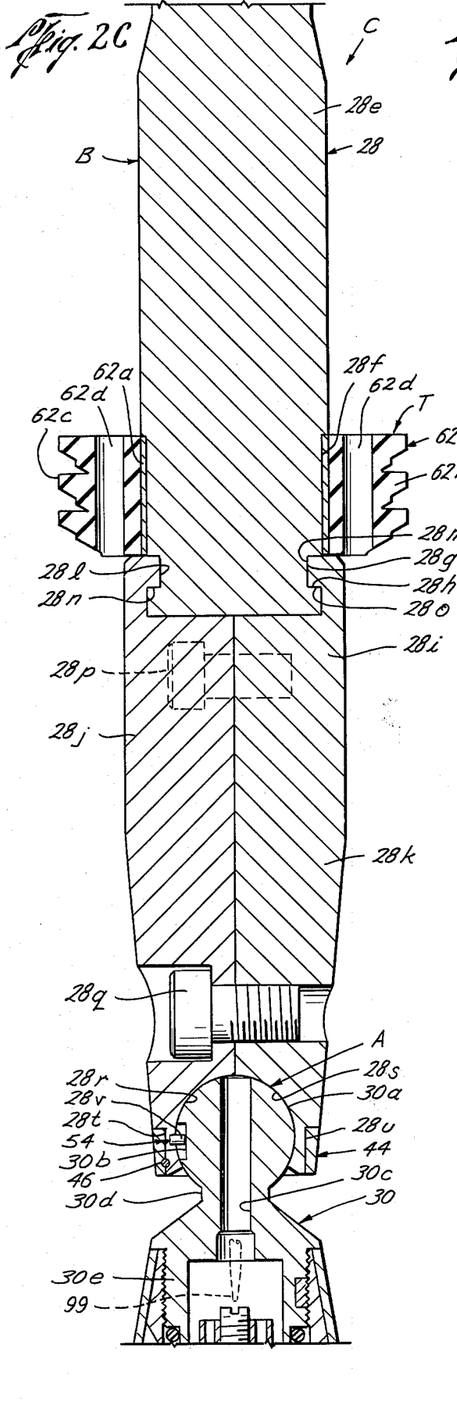

The socket portion 28b is threadedly affixed with centralizer portion 28e which is formed having an outer annular centralizer surface 28f, annular surface 28g, and radial lip 28h formed adjacent the lower portion of the centralizer portion 28e. Locking means 28x, like 26r, prevents unthreading of portion 28b and 28e. Connector portion 28i is preferably formed of connector member halves 28j, 28k, each formed having annular surfaces 28l, 28m, respectively for engaging annular surface 28g and radial lips 28n, 28o, respectively for engaging radial lip 28h. Preferably, the connector member halves 28j, 28k are secured together by a plurality of threaded bolts 28p, 28q. The connector portion 28i is further formed having socket halves 28r, 28s formed with connector members 28j, 28k, respectively as well as suitable annular surfaces 28t, 28u, adjacent the lower end thereof. A suitable pin 28v is adapted to be mounted with connector member 28j adjacent socket half 28r as more fully discussed hereinbelow.

The body B further includes body section 30 which is movably mounted with body section 28 by means of ball 30a which is adapted to be received in socket halves 28r, 28s. Preferably the ball 30a is formed having a suitable detent 30b therein which is adapted to receive pin 28v, as discussed more fully hereinbelow. The ball 30a is formed having a neck 30d which is formed with connector portion 30e. A bore 30c is preferably formed in ball 30a, neck 30d and extends through connector portion 30e. Connector portion 30e is threadedly affixed with housing 30f which secures cap 30g in place therebetween lip 30h of the connector portion 30e and lip 30i of the housing 30f. The housing 30f is secured at its lower end by threads to the body portion 30j which in turn is threadedly affixed to body portion 30k (FIG. 2E). The body portion 30k is formed having a neck 30l and ball 30m formed therewith. A bore 30n and conic annular surface 30o are formed with the body portion 30k adjacent neck 30l and ball 30n.

Figure 2D:
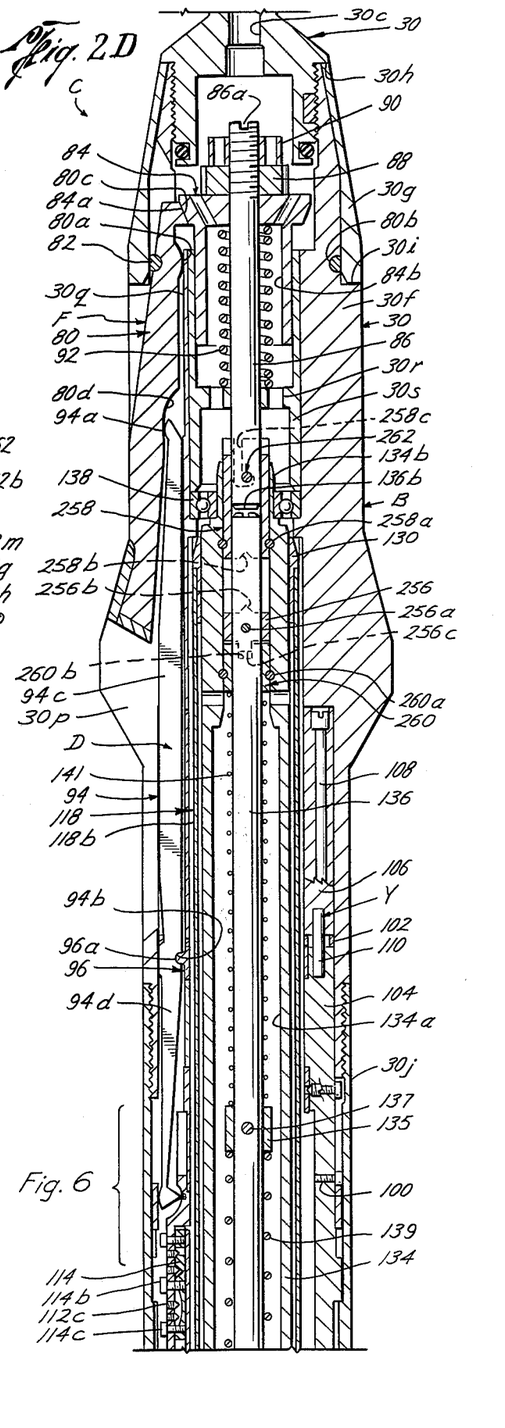
Figure 2E:
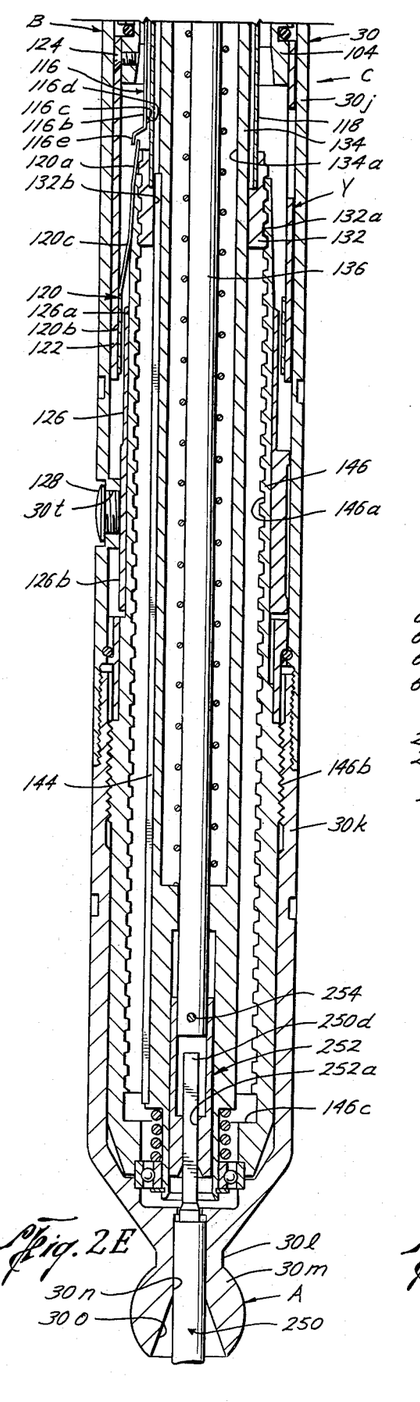
Figure 2F:
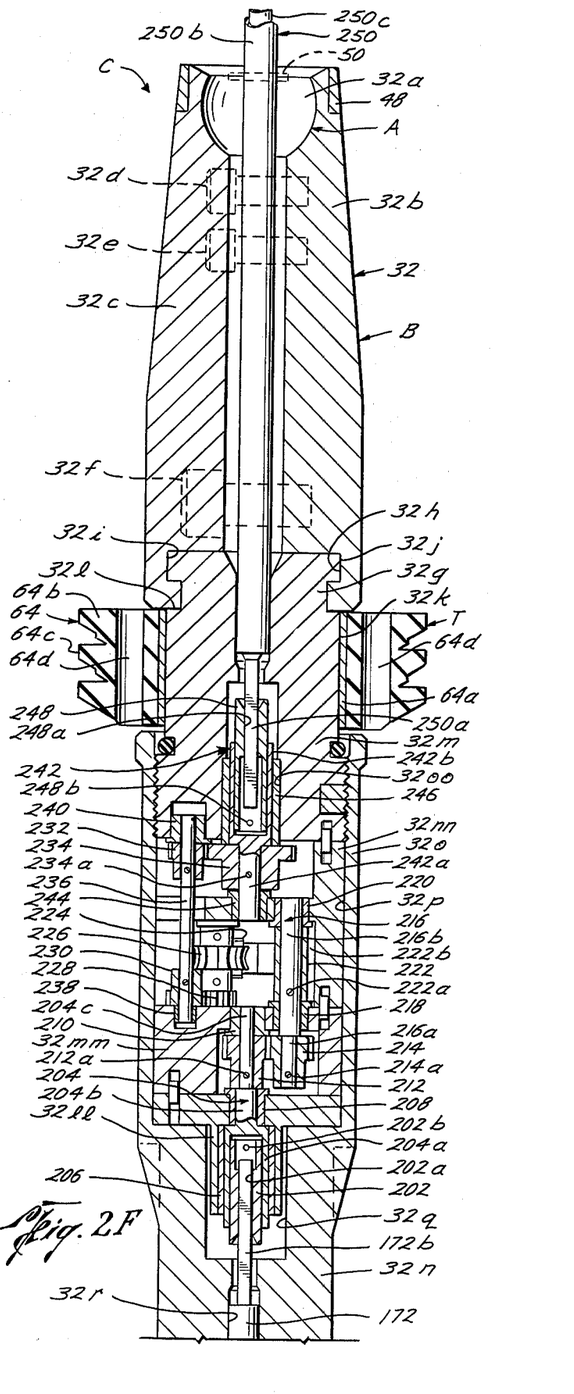

As is discussed more fully hereinbelow the ball 30m is adapted to be received in socket 32a of body section 32 (FIG. 2F). The socket 32a is formed in connector member halves 32b, 32c which are secured together by suitable fasteners such as bolts 32d, 32e, and 32f. The connector member halves 32b, 32c engage centralizer portion 32g with annular surfaces 32h, 32i respectively, engaging the outer annular surface 32j of the upper centralizer portion 32g. The upper centralizer portion 32g includes exterior surface 32k adjacent radial lip 32l. The lower portion 32m of the centralizer portion 32j is threadedly affixed to lower centralizer portion 32n. The lower centralizer portion 32n is threadedly affixed to upper centralizer portion 32g adjacent the upper end 32o thereof. A suitable bore 32p is formed adjacent the upper end 32o of the lower centralizer portion 32n. Axially aligned bores 32q, 32r, 32s (FIG. 2G) are formed within the lower centralizer portion 32n. An outer centralizer surface 32t is formed adjacent the lower end 32u of the lower centralizer portion 32n, with a radial lip 32v formed adjacent the outer centralizer surface 32t. An annular surface 32w is formed adjacent the annular surface 32v having radial lip 32x formed adjacent the annular surface 32w. Outer annular surface 32y is formed adjacent the radial lip 32x. Connector portions 32z, 32aa are affixed to the lower centralizer portion 32n by compatibly formed surfaces 32bb, 32cc, respectively engaging radial lip 32v, surface 32w, radial lip 32x and annular surface 32y. The connector portions 32z, 32aa are secured together by suitable connectors such as bolts 32dd, 32ee, 32ff. It would be appreciated that a plurality of such bolts may be used, not all of which are shown, in order to secure the connector portions 32z and 32aa theretogether. When assembled, the connector portions 32z, 32aa form a bore 32gg which is in axial alignment with bore 32s. A suitable socket 32hh is formed in communication with the bore 32gg adjacent the lower ends 32ii, 32jj of the connector portions 32z, 32aa, respectively.

The body section 34 is affixed to body section 32 of the body B by means of ball 34a being received within the socket 32hh. The ball 34a is formed having a truncated conic surface 34b therein which communicates with bore 34c which is formed in upper member 34d. The upper member 34d is threadedly affixed to drive member housing 34e adjacent the upper end thereof and is formed having a suitable slot 34f therein as disclosed more fully hereinbelow. The drive member housing 34e is threadedly affixed to latch member housing 34g adjacent the lower end thereof. The latch member housing 34g is formed having a suitable cavity 34h formed adjacent the upper end thereof and having a suitable slotted opening 34i adjacent the mid portion thereof. The lower end 34j of the latch housing member 34g is threadedly affixed to connector member 34k. The connector member 34k is formed having a suitable socket 34l and truncated conic surface 34m adjacent thereto. A suitable locking means 34t secures the lower end 34j with connector member 34k.

Body section 36 of the body B is affixed with body section 34 by means of ball 36a being received in socket 34l of the body section 34. The ball 36a is formed having a neck 36b adjacent thereto and extending downwardly therefrom to threaded portion 36c. The threaded portion 36c is threadedly affixed to a gauging member 36d adjacent upper end 36e thereof. The lower end 36f of the gauging member 36d is threadedly affixed to connector portion 36g which is formed having a suitable socket 36h, bore 36i and conic annular surface 36j therewith.

Body section 38 is affixed to body section 36 by means of ball 38a of the body section 38 being received in socket 36h of body section 36. A neck portion 38b is formed with the ball 38a and extends downwardly therefrom and is formed with threaded portion 38c. The threaded portion 38c threadedly engages the upper end 38d of member 38e, with locking means 38t, like 26r, preventing unwanted unthreading thereof. The lower end 38f of member 38e threadedly engages fluid pressure member 38g adjacent the upper end 38h thereof. The fluid pressure member 38g is formed having an outer annular surface 38i and having a bore 38j formed centrally thereof and therethrough. The lower end 38k is threadedly affixed with bottom member 38l adjacent upper end 38m thereof with suitable locking means 38u preventing unwanted separation therebetween. Bottom member 38l is threadedly affixed at its lower end 38n with a bottom cap 38o.

Thus, the body B of the calipering tool C of the present invention is composed of body sections 26, 28, 30, 32, 34, 36 and 38. Each of the body sections are capable of articulating with respect to one another because of the respective ball and socket connections that exist between adjacent body sections. Such ball and socket arrangements include balls 26l, 30a, 30m, 34a, 36a, and 38a and their respective sockets 28a, 28s, 32a, 32ii, 32hh, 34l, and 36h. Such ball and socket arrangements, which are sometimes referred to as knuckle joints, permit the respectiv body sections to articulate with respect to one another in a fashion such that the body sections though joined together, may exist in axially non-aligned position with respect to one another. These ball and socket or knuckle joints comprise the articulating means designated generallly as A of the calipering tool C of the present invention.

As shown in FIG. 2B, the relative amount of articulation that is capable between body sections 26 and 28 is limited by the conic annular surface 28d and its potential engagement with neck 26k, thus limiting the maximum amount of angular displacement, in longitudinal axis thereof, to that of engagement between the neck 26k and surface 28d. Similar structure is found in FIG. 2I wherein body sections 34 and 36 are similarly joined with conic surface 34m limiting the amount of maximum angular displacement from the longitudinal axis thereof upon engagement with neck 36b. Similarly in FIG. 2J, the engagement of neck 38b with conic surface 36j limits the maximum amount of articulate movement between body sections 36 and 38. As such, the ball and socket connections of FIGS. 2B, 2I and 2J thus allow freedom of movement such that the adjacent body sections may not only move angularly with respect to their longitudinal axis but also permit relative rotation between such body sections adjacent such knuckle joints. Thus, the body section 26 may rotate with respect to body section 28 as may body section 36 with respect to body section 34 and as may body section 38 with respect to body section 36.

However, for the reasons set forth more fully hereinbelow, it is preferred that body sections 28, 30, 32 and 34 not be permitted to rotate with respect to one another, yet be permitted to articulate with respect to one another. The structure for accomplishing this goal is best illustrated in FIG. 2C adjacent socket 28r and ball 30a. As is shown, the ball 30a is formed having a detent 30b which is adapted to receive pin 28v. As such, relative articulate or flexing movement between body sections 28, 30 is permitted by the ball 30a and socket halves 28r, 28s arrangement while the engagement of the pin 28v with the detent 30b prevents relative rotation between the ball 30a and socket halves 28r, 28s. Preferably a stiffener ring 44 is mounted with the connector member halves 28j, 28k, adjacent socket halves 28r, 28s for increasing the strength thereof, with the stiffener ring 44 being secured thereto by an appropriate pin member 46. Preferably, similar detent-pin arrangements (not shown) such as detent 30b, pin 28v, are used adjacent the ball 30m and socket 32a as well as between ball 34a and socket halves 32hh, 32ii. Stiffener ring 48 is preferably mounted with connector member halves 32b, 32c and is pinned thereto by pin member 50 (FIG. 2F). Similarly, stiffener ring 52 is mounted with connector portion halves 32z, 32aa and is appropriately pinned thereto by a suitable pin member (not shown) similar to pin members 46, 50. Accordingly, the body sections 28 and 30, 30 and 32, 32 and 34, are permitted to flex and/or articulate with respect to one another while relative rotation therebetween is prevented. These detent 30b-pin 28v arrangements form the anti-rotation means designated generally as 54 (FIG. 2C) of the present invention with the anti-rotation means 54 preventing rotation of adjacent body sections with respect to each other.

The calipering tool C of the present invention further includes fluid pressure retaining means designated generally as R mounted with the body B for maintaining the body B in a sealable relation to the well tubing or pipe P to permit movement of the body B along the pipe P as desired in response to fluid pressure acting upon the fluid pressure retaining means R. The fluid pressure retaining means R includes a lower fluid pressure retainer 56 (FIGS. 2J, 2K) which is adapted to be mounted with the fluid pressure member 38g. The fluid pressure retainer 56 is preferably secured between the lower end 38f of member 38e and the upper end 38m of bottom member 38l when the members 38e, 38l are in threaded engagement with fluid pressure member 38g. Preferably the lower fluid pressure retainer 56 is formed having an inner sleeve 56a which is adapted to engage the outer annular surface 38i of the fluid pressure member 38g with an appropriate seal 58 being disposed between the fluid pressure member 38g and inner sleeve 56a. The lower fluid pressure retainer further includes a locomotive portion 56b which is preferably formed of a hard rubber or other somewhat resilient material and includes a plurality of annular wipers or rings 56c which are adapated to engage the inner surface of the tubular member 18 in a sealable relation. The lower fluid pressure retainer is further formed having an upper end surface 56d which is suitable for receiving fluid pressure thereon. As is discussed more fully hereinbelow, fluid pressure acting upon upper end surface 56d of the lower fluid pressure retainer 56 results in movement of the calipering tool C of the present invention along and down into the tubular member 18.

The fluid pressure retaining means R further includes an upper fluid pressure retainer 60 (FIG. 2A) which is adapted to be mounted with locomotive section 26d of body section 26. The upper fluid pressure retainer 60 includes an inner sleeve 60a which is adapted to be fitted about the locomotive section 26d in engagement with the outer surface 26f with suitable seal 42 being disposed therebetween the inner sleeve 60a and the locomotive section 26d. The upper fluid pressure retainer 60 further includes a locomotive or pig portion 60b which is mounted with the inner sleeve 60a and is preferably formed of a hard rubber or other suitable resilient material. Preferably, the locomotive or pig portion 60b is formed having a plurality of annular wipers or rings 60c which are adapted to sealably engage the inner surface of the tubular member 18. When the calipering tool C of the present invention is disposed within a well tubing or pipe P. The upper fluid pressure retainer further includes a lower end surface 60d which is adapted to receive fluid pressure thereon to permit movement of the body B of the calipering tool C of the present invention out from the well tubing or pipe P as desired. The upper fluid pressure retainer 60 is mounted between the adapter 26b and radial lip 26h of body section 26 and is removable therefrom upon unthreading of the locomotive section 26d from the adapter section 26b for replacement as is necessary and when desired.

Figure 2G:
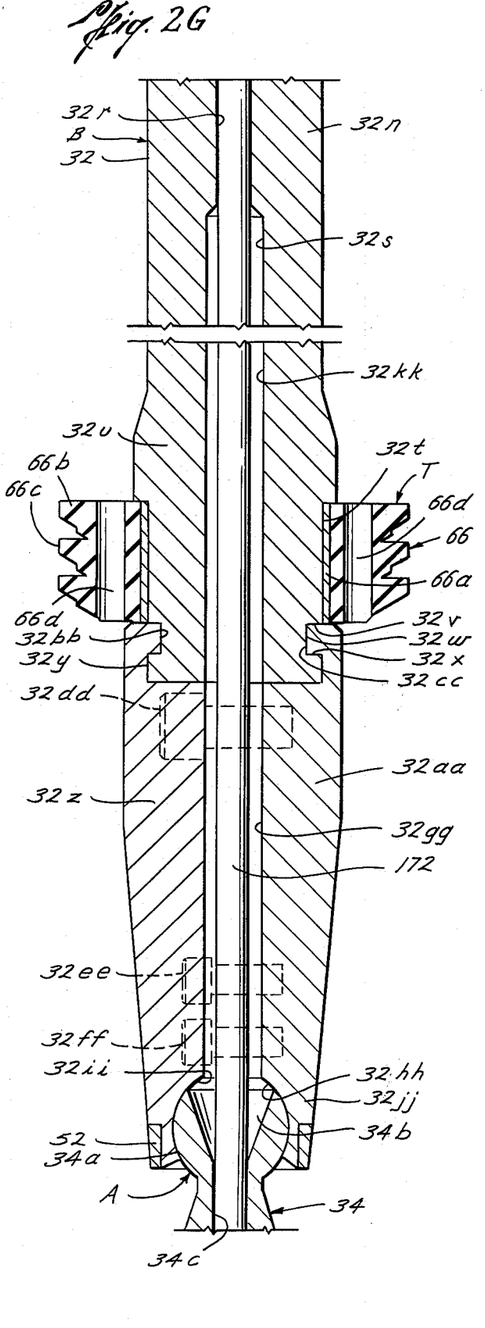
Figure 2H:
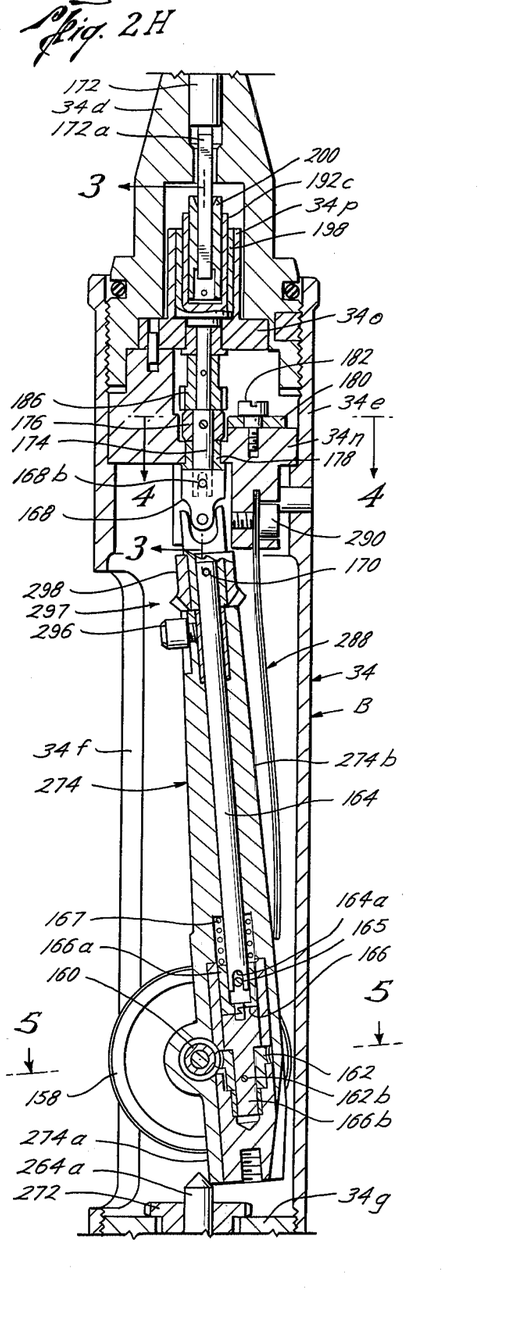
Figure 2I:
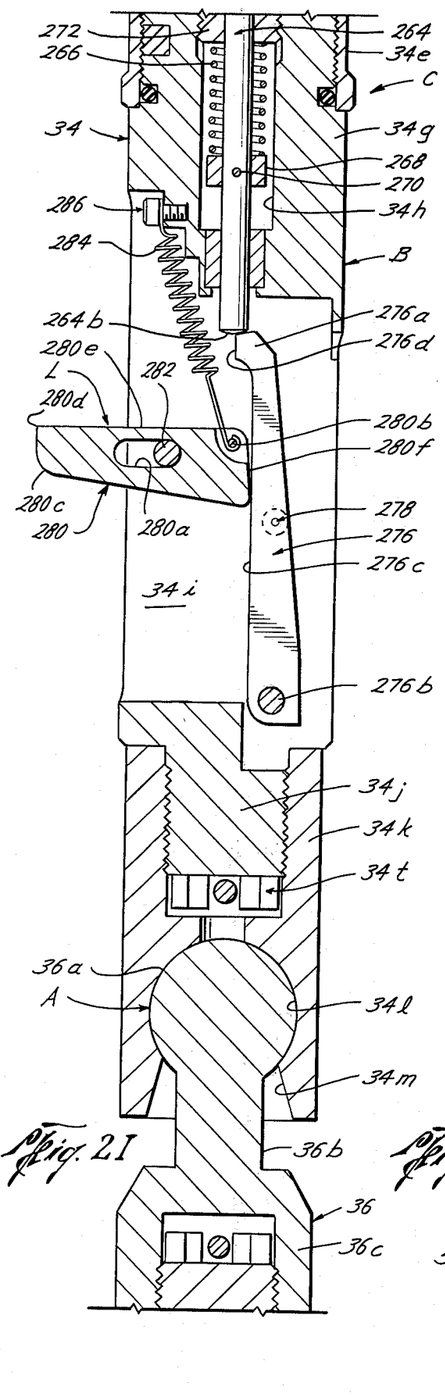
Figure 2J:
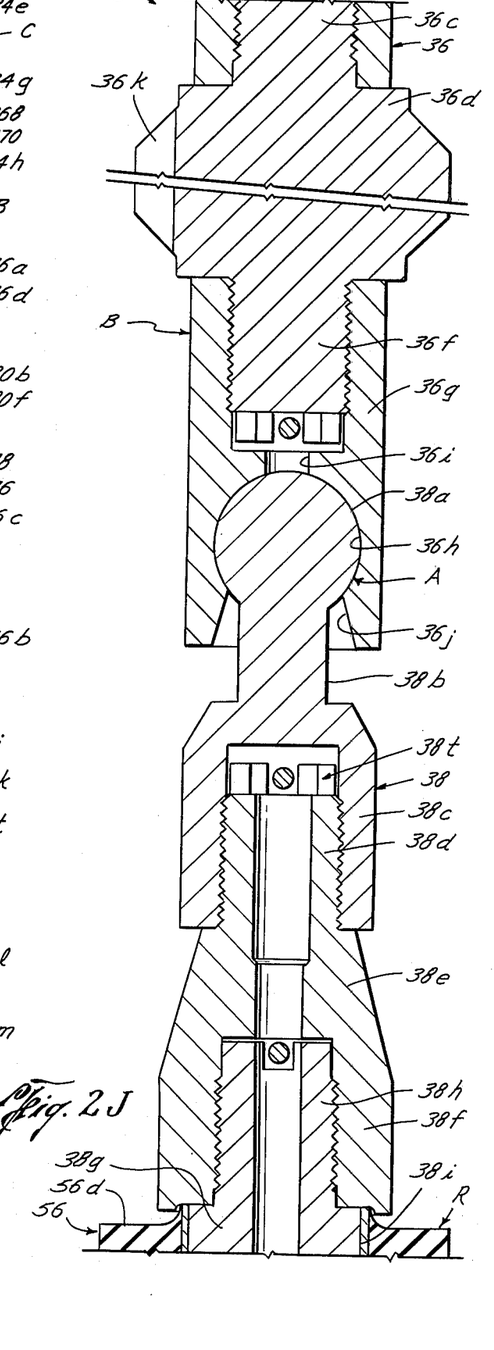
Figure 2K:
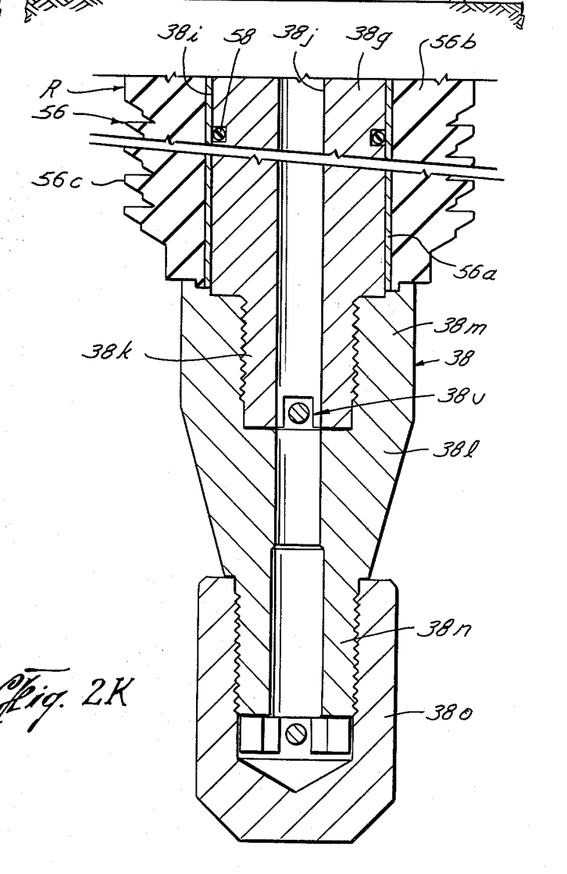

The calipering tool C of the present invention further includes centralizing means designated generally as T which includes centralizers 62, 64, 66 (FIGS. 2C, 2F, 2G). Preferably, each of the centralizers 62, 64, 66 is formed having an inner sleeve 62a, 64a, 66a, respectively which are adapted to fit about an outer annular centralizer surfaces 28f, 32k, 32t, respectively. Centralizer portions 62b, 64b, 66b are mounted with the inner sleeves 62, 64a, 66a, respectively with each of such centralizer portions 62b, 64b, 66b, having a plurality of annular wiper or rings 62c, 64c, 66c, respectively formed therewith. Preferably, each of the centralizers 62, 64, 66 is formed having a plurality of fluid openings 62d, 64d, 66d formed in the centralizer portion 62b, 64b, 66b, respectively, with such fluid openings 62d, 64d, 66d formed in parallel relation with the axial alignment of the body B of the calipering tool C. The centralizing means T helps to insure that the calipering tool C is properly centralized and oriented within the well tubing 18 as it is forced by fluid pressure therethrough. In cooperation with the flexing and/or articulating of the calipering tool C permitted by the articulating means A, the centralizing means T prevents the body sections 28 and 32 from contacting directly the inside surface of the tubular member 18. Furthermore, it should be noted that the centralizers 62 and 64 are mounted such that they are directly above and below, respectively, the body section 30 which maintains the feeler means F of the calipering tool C of the present invention, to insure proper disposition thereof within the well tubing or pipe P, as set forth more fully hereinbelow. Furthermore, the openings 62d, 64d, 66d allow the passage and transmission of fluid pressure therethrough to permit the fluid pressure to act upon the upper end surface 56d of lower fluid pressure retainer 56 and/or lower end surface 60d of upper fluid pressure retainer 60, as desired.

It will be appreciated that the body 36 of the body B includes limiting means 37 including "no-go" gauging member 36d which includes radially outwardly extending tabs 36k that are disposed about the outer perimeter thereof. The tabs 36k of the "no-go" gauging member 36d are adapted to engage a restriction (not shown) within the tubular member 18 of the pipe P to prevent the calipering tool C of the present invention from traveling beyond a certain point in the pipe P, such as the lower end thereof, as may be desired.

The calipering tool C of the present invention has a plurality of feeler means F which extend through slots 30p formed in a body section 30 (FIG. 2D). The sides of the openings or slots 30p serve to prevent turning of the feeler means F in response to lateral forces acting on the calipering tool C. The feeler means F includes feelers such as feeler 80 which is normally made of steel and such feelers 80 are circumferentially arranged about the body section 30 so that each of such feelers 80 would normally engage the interior surface of the tubular member 18 at each elevation by the calipering tool C. Each feeler 80 has an inner surface 80a which is in contact with surface 30q of body section 30. Each feeler 80 also has an outer notch 80b which is positioned on a pivot ring 82, which is preferably of a circular cross section and mounted with the interior surface of the cap 30g of body section 30. Thus, each of the reelers 80 is confined against lateral movement except for a pivoting action about the pivot ring 82. In order to retain feelers in their retracted position during pumping down of the calipering tool C into the desired position of the pipe P for beginning a calipering operation, each of the feelers 80 is provided with an internal surface 80c which is normally tapered outwardly and upwardly (FIG. 2D) for engagement with a retaining collar 84 which preferably has a correspondingly tapered surface 84a for engagement with the surfaces 80c of feelers 80. The retaining collar 84 is threadedly affixed to release rod 86 and is retained in place by locking rings 88, 90. The retaining collar 84 is preferably formed having a bore 84b formed therein and is adapted to receive a spring 92 therein. The spring 92 is disposed between mid-portion 30r of member 30s mounted within housing 30f of body section 30, in a compressed state. Upon release of the release rod 86 as described herein below, the spring 92 is allowed to expand forcing the retaining collar 84 upwardly such that surfaces 80c and 84a are no longer in engagement so that the feeler means F may then move laterally or radially outwardly into engagement with the interior surface of the tubular member 18. The locking rings 88, 90 position and locate the retaining collar 84 with the release rod 86 as is necessary.

The calipering tool C of the present invention further includes transmitting means D which is adapted to engage feeler means f and transmit movement thereof to a portion of the stylus members S. The transmitting means D includes transmitting members or arms 94 which are provided in the body B for each of the feeler means F. Each feeler 80 has an inner pocket or curved surface 80d which is engaged by a rounded or curved head 94a at the upper end of each of the transmitting arms 94. The transmitting arms 94 are preferably formed of a resilient metal such as spring steel and are so mounted that they exert an outward resilient force on the feeler means F to urge them into contact with the inside surface of the well tubing or pipe P being calipered after the feeler means F have been released to a calipering position. The transmitting arms 94 are prevented from turning or twisting and are therefore guided in their lateral or radial movement by the walls of slots 30p for a portion of their length near the upper end thereof. Each of the transmitting arms 94 has an appropriate notch 94b by which the transmitting arm 94 is mounted on a pivot ring 96 which has an appropriate annular pivot lip 96a adapted to be received within notch 94b of transmitting arms 94. The pivot lip 96a provides a support for preventing each of the transmitting arms 94 from moving longitudinally and serves as a fulcrum when a bending moment is imparted to each of the transmitting arms 94 as will be explained. The upper portion 94c of transmitting arm 94 above the pivot ring 96 is adapted to flex or bend as the feeler means F therewith moves inwardly and outwardly in response to engagement with the internal surfaces encountered in the pipe P. Such flexing or bending of the upper portion 94c of each transmitting arm 94 causes the lower portion 94d (FIG. 6) of each transmitting arm 94 to be placed under a strain. This strain deforms the lower portion 94d thereof for imparting longitudinal movement to each of such portions 94d. Each transmitting arm 94 also has an outer surface 94e which is in engagement with a head ring 98 for preventing outward lateral movement of each lower portion 94d of the transmitting arm 94.

Likewise, inward lateral movement of the lower portions 94d of each of the transmitting arms 94 is prevented by maintaining each of the upper portions 94c under constant compressive stress regardless of the position of the feeler means F. This results in the outer surface 94e (FIG. 6) being urged into contact with the wall 98a of the head ring 98 in body section 30 and also results in each transmitting arm 94 being maintained in firm engagement at its notch 94b with the annular pivot lip 96a of pivot ring 96. A suitable pin 100 secures the head ring 98 in its proper position with respect to body section 30. The outer surface 94e of transmitting arm 94 is adapted to engage the head ring surface 98a for longitudinal movement of the transmitting arm 94 with respect thereto.

A resilient ring 102, preferably formed of rubber or other resilient material, is capable of forming a seal with the pivot ring 96 and also with each of the transmitting arms 94. The ring 102 is confined between a stylus tube 104 and stylus tube extension 106, to likewise provide a seal therebetween. The ring 104 is located as close to the annular pivot lip 96a of pivot ring 96 as possible so that during flexing of the upper portions 94c of transmitting arms 94, substantially no movement occurs in the arms 94 where the seal ring 102 is in engagement therewith. Therefore, the seal provided by the rubber ring 102 is maintained at all times even though the transmitting arms 94 are flexing and/or bending during use.

It should also be noted that stylus tube 104 and the stylus tube extension 106 are secured together with a plurality of threaded bolts 108 (FIG. 2D) which extend through the stylus tube extension 106, through seal ring 102 thereinto stylus tube 104 for securing stylus tube 104 with the stylus tube extension 106. Suitable pins 110 are used to insure proper alignment therebetween the stylus tube 104 and stylus tube extension 106.

An adjusting block 112 is adapted to receive the tip 94f of the transmitting arm 94 in a notch 112d in surface 112a formed in receiving arm 112b of the adjusting block 112. The adjusting block 112 is adapted to move longitudinally in response to action of the lower portion 94d of transmitting arm 94. Preferably, the longitudinal movement thereof is guided by and within a suitable slot 104a formed with the stylus tube 104 for allowing the adjusting block 112 to move along the axial length of the calipering tool C in response to movement of the tip 94f of the transmitting arms 94. Movement of the adjusting block 112 in slot 104a permits sliding movement but prevents lateral movement therebetween. It should be appreciated that other types of guide structures may be used for the adjusting blocks 112, but the structure illustrated is particularly of the preferred form. Suitable adjustment screws 122c (FIG. 6) are mounted in the adjusting arm 112g of adjusting block 112 to permit adjustment between the adjusting block 112 and the fastening means 114. The stylus members S are adapted to be mounted on the fastening means 114 by means of soldering or other suitable means (FIG. 2D). Rotation of the taper pointed adjustment screws 112c permits relative movement of the adjustment block 112 with respect to the fastening means 114. When the adjusted positions of all stylus members S are obtained the locking screws 114d of fastening means 114 are tightened so as to maintain the desired adjustment therebetween.

The stylus members S include a plurality of active styli 116 which are secured to the adjusting block 112 by the fastening means 114. It will be appreciated that there are a suitable number of active styli 116 that correspond with the actual number of feelers 80 of the feeler means F. Accordingly, there are a corresponding number of adjusting blocks 112 and fastening means 114 respectively to allow the mounting of the proper number of active styli 116 with such adjusting blocks 112.

The active stylus 116 includes a fastening portion 116a (FIG. 2D), a spring portion 116b (FIG. 2E), a stylus 116c having stylus point 116d therewith, and an engaging lip portion 116e. The fastening portion 116a of the active stylus 116 is adapted to be mounted with the fastening means 114 as heretofore explained with the spring portion 116b extending radially inwardly from the fastening portion 116a. The stylus point 116d is mounted with the spring portion 116b at the radially innermost portion of the stylus 116 with an engaging lip portion 116e formed adjacent thereto. The downwardly and outwardly lip portion 116e serves in the retraction of the stylus spring portion 116b as will be explained. The stylus points 116d are adapted to engage or contact the external surface of a cylindrical chart 118 when operating the calipering tool C of the present invention. Relative movement between the chart 118 and the stylus members S of the present invention results in lines or other indications being recorded on the surface of the chart 118 to indicate variations in the interior surface of the tubular member 18 which are sensed by the feeler means F of the calipering tool C of the present invention.

The adjustment of the styli 116 with respect to the cylindrical chart 118 is made very sensitive by the adjusting structure shown in FIG. 2D so that accurate positioning of the styli 116 with respect to one another and the chart 118 may be accomplished. Since relatively small changes are recorded with the calipering tool C of the present invention it is important for the adjustment of the position of the styli 116 to be accurate. Moving of the fastening means 114 allows relative positioning of the styli 116 with respect to the adjusting blocks 112 and a stylus tube 104 for proper positioning thereof. Each of the active styli 116 is adjusted separately and individually with the structure described hereinabove so that accurate positioning of the stylus points 116d is thereby accomplished.

After the adjustment is accomplished, then the active styli 116 move together with the adjusting block 112 in response to movement of the strained lower portion 94d of the transmitting arms 94 connected therewith. A sleeve 120 (FIG. 2E) is used to retract the styli 116 so as to move the stylus points 116d out of contact with the chart 118. The sleeve 120 has a plurality of retractor fingers 120a adjoining a tubular portion 120b by means of engaging portion 120c. The engaging portion 120c is affixed to the finger case 122 which is adapted to be mounted within body portion 30j. Suitable fasteners 124 extend through the finger case 122 and threadedly engage the stylus tube 104 for affixing the finger case 122 therewith. An appropriate number of retractor fingers 120a are formed with the tubular portion 120b of the sleeve 120 such that there are a total number of retractor fingers 120a equal to the total number of stylus members S. As such, the retractor fingers 120a are adapted to engage the engaging lip portions 116e of the active styli 116. Each retractor finger 120a engages an engaging lip portion 116e to affect a retraction of the styli 116 when the retractor finger 120a is moved radially or laterally outwardly. The stylus members S preferably are made of a resilient material such as spring steel or beryillium copper so that the inherent resiliency thereof will return them to a position shown in FIG. 2E when it is desired to position the styli 116 in contact with the chart 118.

The radial or laterally outwardly movement of the retractor fingers 120a or sleeve 120 is accomplished by moving a retractor sleeve 126 (FIG. 2E) longitudinally upwardly relative to the sleeve 120 so as to force the retractor fingers 120a outwardly and thereby force the active styli 116 of the stylus members S outwardly. The upward longitudinal movement of the retractor sleeve 126 is accomplished by removing a plug screw 128. Preferably a screwdriver or other similar tool (not shown) can be inserted into the opening 30t formed in body portion 30j of body section 30 from which the plug screw 128 is removably mounted to pry or otherwise urge the retractor sleeve 126 upwardly a sufficient distance to engage the engaging portion 120c adjacent end portion 126a of the retractor sleeve 126. Upon engagement therewith, the retractor fingers 120a are moved laterally outwardly. The plug screw 128 is then replaced. When it is desired to release the retractor fingers 128 and to thereby return the stylus members S into contact with chart 118, the plug screw 128 is again removed and the retractor sleeve 126 is moved downwardly with respect to the stylus members S by inserting a screwdriver or other similar tool into opening 30t to pry or otherwise move the retractor sleeve 126 by engagement thereof with notches 126b formed with the retractor sleeve 126. The plug screw 128 is replaced to close the opening 30t. The stylus members S would normally be retracted when the calipering tool C of the present invention is transported and/or while such was not in the well. In such a case, the plug screw 128 must be removed prior to the placement of the calipering tool C of the present invention into the well. After removal of the plug 128, the retractor sleeve 126 may be lowered to the position shown in FIG. 2E and the plug screw 128 is reinserted to close the opening 30t with the stylus members S in a proper position for marking on the chart 118.

Considering now the construction of the chart 118 and the mounting means therewith for effecting a helical or spiral rotation of the chart 118 relative to the stylus members S, reference is made to FIG. 2D wherein it can be seen that the chart 118 is connected at its upper end with guide sleeve 130 and at its lower end with an annular nut 132 (FIG. 2E) having external threads 132a formed therewith. The chart 118 is positioned about a central drive tube 134 which is provided with a central bore 134a therethrough. A portion of release rod 86 and rod 136 extend into bore 134a. The rod 136 has a collar 135 mounted therewith and secured thereto by a pin 137. A spring 139 is mounted between the collar 135 and drive tube 134 for urging the rod 136 upwardly while spring 141 is mounted above collar 135 to assist in the assembly of the calipering tool C.

The drive tube 134 has an upper reduced diameter section 134b which is mounted in suitable bearings 138 which are confined below member 30s in body section 30 of the body B to provide anti-friction means for the support of the upper end of the drive tube 134 during rotation thereof relative to the body B. Compression spring 92 acts between the retaining collar 84 and midportion 30r thus keeping the member 30s and bearing 138 in place at all times. The drive tube 134 is connected with the annular nut 132 by a key 144 which fits within keyway 132b in the nut 132. Rotation of the drive tube 134 is imparted to the annular nut 132, but the nut 132 is permitted to move longitudinally relative to the drive tube 134. The nut 132 is in threaded engagement with an internally threaded sleeve 146 which has internal threads 146a in threaded engagement with threads 132a of annular nut 132. The sleeve 146 is secured with the body section 30 by threads 146b engaging a compatibly formed threaded portion of body portion 30k. As the nut 132 is rotated by rotation of the drive tube 134, the nut 132 is caused to travel spirally in accordance with the pitch and direction of the threads 132a, 146a. The threaded sleeve 146 may be secured in any manner to the body section 30 of the body B so as to establish a connection such that the threaded sleeve 146 remains fixed in the body B and does not rotate when the nut 132 is rotated.

The chart 118 is shown in FIG. 2E as it would appear at the beginning of the recording. The chart 118 may be made of various materials, such as metals or plastics which may be scratched, embossed, or otherwise changed so that the record thereon may be subsequently viewed or detected. During storage and/or transportation of the calipering tool C of this invention, the chart 118 may be telescoped or partially telescoped within the sleeve 146. During use, the chart 118 will be rotated to move in a downward direction relative to the threaded sleeve 146. Since the chart 118 would thus be moved rotating longitudinally downwardly relative to the stylus members S, the stylus points 116d of the styli 116 would cut or trace on the exterior surface of the chart 118 a plurality of substantially parallel helical lines of the same pitch and direction, assuming the feeler means F are engaging the interior surface of a substantially smooth tubular member 18. However, for each feeler 80 which encounters an irregularity in the interior surface of the tubular member 18 of the pipe P being calipered, there will be a longitudinal movement of the active styli 116 connected therewith so that there will appear a deflection in the smooth spiral line being traced, cut or marked by the particular active stylus point 116d.

When the annular nut 132 is rotated sufficiently to bottom out against sleeve surface 146c (FIG. 2E), further rotation of the rod 136 will cause slippage between the tapered recess 258b (FIG. 2D) of sleeve 258 and the extended tapered driving point 256b of sleeve 256 thus preventing damage to all parts, as discussed hereinbelow.

The drive tube 134 may be rotated with various types of drive mechanisms, but as illustrated in the drawings, and in particular FIG. 2H, the drive tube 134 is driven by a drive wheel 158 which, when released, engages the interior surface of the tubular member 18 of the pipe P.

Figures 3, 4, 5, 6:
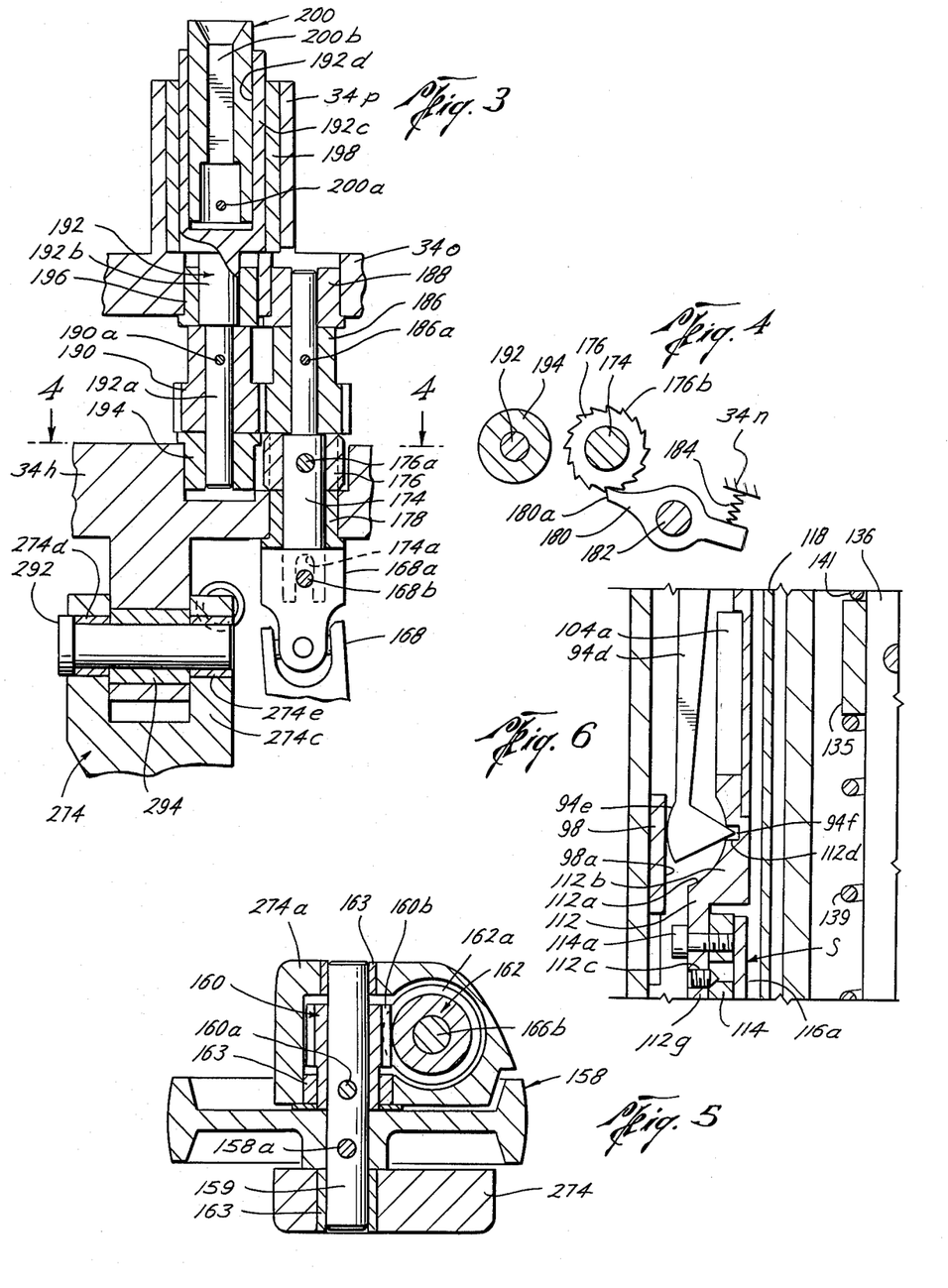

The drive wheel 158 rotates or drives gears 160, 162 to cause a stub shaft 164 to be driven through a one way clutch 166, which may be of any suitable construction. As best seen in FIG. 5, the drive wheel 158 is pinned to shaft 159 by drive wheel pin 158a with gear 160 being pinned to shaft 159 by gear pin 160a. Rotation of gear 160 results in the teeth 160b thereof engaging teeth 162a of gear 162 resulting in rotation thereof. Suitable bushings 163 are mounted with the shaft housing 274a and housing cover 274 to allow the shaft 159 to freely rotate in a proper, aligned fashion. The lower end of stub shaft 164 is formed with a suitable slot 164a formed therein which is adapted to receive pin 165 which is in engagement with the one-way clutch 166. Spring 167 provides a constant force upon the upper portion 166a of one-way clutch 166 to which the pin 165 is attached. The lower portion 166b of the one-way clutch is secured to the gear 162 by means of gear pin 162b. The irregular mating surface between the upper portion 166a and lower portion 166b of the one-way clutch 166 permits rotation of the stub shaft 164 only under the circumstance when the drive wheel 158 is in engagement with the interior surface of the tubular member 18 and the calipering tool C is being forced upwardly within the tubular member 18. Engagement of the drive wheel 158 and the tubular member 18 under condition when the calipering tool C is moved downwardly within the tubular member 18 will cause a slippage to occur between the upper and lower portions 166a, 166b of the one-way clutch 166, thus preventing rotation of stub shaft 164.

The stub shaft 164 is connected to a universal joint 168 by means of pin 170 to result in rotation of flexible shaft 172. As best seen in FIGS. 2H and 3, the upper portion 168a of the universal joint 168 is pinned by universal joint pin 168b with shaft 174 for permitting relative longitudinal movement therebetween by means of the pin 168b being adapted to be received within slot 174a formed in shaft 174. Ratchet gear 176 is secured to shaft 174 by pin 176a. The shaft 174 is mounted in suitable bushing 178 mounted with shaft support 34n within drive member housing section 34e of body section 34. The ratchet gear 176 (FIG. 4) is adapted to have its teeth 176b be engaged with a suitable pawl 180 that is mounted with the shaft support member 34n by suitable fastener 182 for relative rotation of the pawl 180 about the fastener 182. Spring 184 which is secured with the pawl 180 and shaft support member 34n insures that the tip 180a of the pawl 180 is maintained in firm engagement with the teeth 176b of ratchet gear 176. As shown in FIG. 4, the ratchet gear 176 is capable only of clockwise rotation, for counterclockwise rotation results in the tip 180a of the pawl 180 engaging the teeth 176b the ratchet gear 176 preventing rotation thereof. Thus, the shaft 174 is capable only of rotating in a clockwise fashion as viewed in FIG. 4.

This limited clockwise rotation of shaft 174 is transmitted to gear 186 which is secured to shaft 174 by pin 186a. The upper end of shaft 174 is mounted in a suitable bushing 188 that is mounted with support member 34o of the upper member 34d of body section 34. Rotation of the gear 186 results in rotation of gear 190 which is in mating engagement with gear 186. Gear 190 is mounted with shaft 192 which is mounted within the body section 34 by means of bushing 194 with support member 34n and bushing 196 with support member 34o. The gear 190 is secured by pin 190a to the lower portion 192a of the shaft 192, with the midportion 192b of shaft 192 being disposed within the bushing 196 and the upper portion 192c extending upwardly therefrom. Preferably, the upper portion 192c is adapted to be mounted in a suitable bushing 198 with the upper portion 34p of support member 34o.

Shaft socket 200 is adapted to be mounted within the bore 192d formed in the upper portion 192c of shaft 192 and affixed thereto by socket pin 200a. The shaft socket 200 is formed having a cavity 200b in the central portion thereof, with the cavity 200b being preferably of a rectangular cross-section for the reasons stated more fully hereinbelow. The cavity 200b is adapted to receive the lower end 172a of flexible shaft 172, with the lower end 172a being preferably of a compatibly formed rectangular cross-sectional area as that of the cavity 200b. As such, the lower end 172a is capable of reciprocal movement both upwardly and downwardly in the cavity 200b of shaft socket 200 while permitting rotation of the flexible shaft 172. The flexible shaft 172 is primarily mounted within bore 34c of body section 34, through conic surface 34b, into bores 32gg, 32kk, 32s, 32r in body section 32. The upper end 172b of flexible shaft 172 is preferably of a rectangular cross-sectional area similar to lower end 172a. The upper end 172b of flexible shaft 172 is adapted to extend into bore 32q and be received by shaft socket cavity 202a of shaft socket 202, with the cavity 202a being preferably of a rectangular cross-section similar to that of the upper end 172b of the flexible shaft 172. Thus, the upper end 172b of flexible shaft 172 may move vertically upwardly and downwardly with respect to the shaft socket 202 while transmitting rotational movement thereto.

It will be appreciated that the flexible shaft 172 extends through the ball 34a which is permitted to articulate within socket halves 32hh, 32ii, as limited by the conic surface 34b. During such articulated movement between the body sections 32, 34, the flexible shaft will flex or bend to accomodate such articulated movement with the attendant changes in length of the flexible shaft 172 being compensated for by the lower and upper end portions 172a, 172b being able to move vertically upwardly and downwardly relative to their respective shaft sockets 200, 202, yet transmit rotation therebetween.

In a fashion similar to shaft socket 200, shaft socket 202 is pinned with shaft 204 by pin 202b adjacent lower end 204a of shaft 204. A bushing 206 is mounted with support member 32ll to provide freedom of movement of the shaft 204 as does bushing 208 which supports the mid-portion of shaft 204 for rotation. The upper portion 204c of shaft 204 is secured in bushing 210 mounted with support 32mm. Gear 212 is affixed with the shaft 204 by pin 212a and is adapted to engage a compatibly formed and mating gear 214 mounted with shaft 216 and secured thereto by pin 214a adjacent the lower end 216a of shaft 216. The upper end 216b of shaft 216 is secured in bushings 218, 220 mounted with support 32mm, 32nn, respectively.

Worm gear 222 is mounted with the shaft 216 by pin 222a, which upon rotation thereof, results in rotation of transmission gears 222b, 224, 226, 228, 230, 232, 234. More specifically, rotation of worm gear 222b results in rotation of worm gear 224 causing rotation of worm gear 226. Gear 228 engages gear 230 on shaft 236 which in turn causes rotation of gear 232 which is in mating engagement with gear 234. Shaft 236 is supported by suitable bushings 238, 240 that are mounted with the support 32mm and lower portion 32m, respectively.

The transmission gears are utilized to adjust the rate of rotation of the flexible shaft 172 to a rate of rotation that is appropriate for driving the chart 118 and accordingly a gear reduction and/or step-up may be accomplished by the transmission gears based upon the specific needs involved.

Rotation of transmission gear 234 results in rotation of output shaft 242, for the transmission gear 234 is affixed to the lower portion 242a of the output shaft 242 by suitable pin 234a. The lower portion 242a is secured with the support 32nn by a suitable bushing 244, with the upper portion 242b of the output shaft 242 extending into bore 32oo formed in lower portion 32m of the body section 32 with a suitable bushing 246 disposed therebetween. Rotation of the upper portion 242b of the output shaft 242 results in rotation of shaft socket 248 which is preferably formed having a cavity 248a of a substantially rectangular cross-sectional area and adapted to be pinned with the output shaft 242 by pin 248b. The lower end 250a of flexible shaft 250 is adapted to be received in the cavity 248a of shaft socket 248 with the lower end 250a being capable of moving vertically within the cavity 248a, yet permitting the transmission of rotational torque therebetween.

The flexible shaft 250 extends upwardly from the shaft socket 248 through centralizer portion 32g, connector members 32b, 32c, of body section 32 thereinto ball 30m and bore 30n of body section 30 of the body B of the calipering tool C of the present invention. It should be noted that the flexible shaft 250 preferably includes a suitable protective covering 250b (FIG. 2F) that surrounds a flexible core shaft 250c with the flexible shaft 172 being of a similar structure. The upper end 250d of flexible shaft 250 is received in shaft socket cavity 252a of shaft socket 252. Preferably, the cavity 252a is of a similar rectangular cross-sectional configuration corresponding with a similarly formed rectangular cross-sectional configuration of upper end 250d of flexible shaft 250. It will be appreciated that any suitable configuration end portion may be used on flexible shafts 172, 250 and compatibly formed cavities such that torque and rotational movement may be transferred between respective sockets and flexible shafts while the shaft is capable of flexing and/or moving vertically upwardly or downwardly with respect to the cavities upon flexing or articulation of the calipering tool during bending or articulating movements thereof. As discussed hereinabove with respect to the bending and flexing between body sections 34 and 32, the flexible shaft 250 permits the transfer of torque between body sections 32 and 30 through the ball 30m, socket 32a assembly even though the body sections 30, 32 are in a non-axially aligned position, with the flexible shaft capable of bending and/or flexing in response to articulated movement therebetween such body sections 30, 32. Vertical movement of the end portions 250a, 250d in their respective sockets 248, 252 allows for variation in length of the flexible shaft 250 as the calipering tool C flexes and/or articulates. Thus, the flexible shafts 172 and 250 with their respective shaft sockets 200, 202, 248, 252 comprise the flexible drive shaft means of the present invention, with the shaft sockets comprising the socket means of the present invention.

Rotation of the shaft socket 252 results in rotation of rod 136 due to the pinned relationship therebetween by pin 254 securing the rod 136 with the shaft socket 252. The rod 136 is capable of rotating within the tube drive 134. The drive rod 136 is affixed to sleeve 256 by means of pin 256a. Sleeve 256 is formed having a pointed section 256b at the upper end thereof and a depending tab 256c adjacent the lower end as described more fully hereinbelow. A sleeve 258 is mounted within the drive tube 134 adjacent the upper end 134b thereof with the sleeve 258 being pinned to the drive tube 134 by means of pins 258a. The sleeve 258 is further formed having a tapered recess or V-shaped notch 258b adjacent the lower end thereof that is compatibly formed to receive extended tapered driving point or pointed section 256b of sleeve 256 which forms the clutch means of the present invention. A sleeve 260 is mounted within the drive tube 134 and pinned thereto by means of pins 260a. The upper end of sleeve 260 is formed having a notched section 260b which is adapted to receive tab 256c of sleeve 256. The sleeve 258 is preferably formed having a J-slot 258c formed adjacent the upper end thereof as is more fully explained hereinbelow. As a consequence, rotation of drive rod 136 results in rotation of sleeves 258, 260 and rotation of drive tube 134. As such, the drive tube 134, drive rod 136, and clutch means noted hereinabove comprise the drive means of the present invention.

There are three separate and distinct driving configurations which result from movement of the drive rod 136 upward and downward as permitted by the shaft socket 252 adjacent the lower end thereof. FIG. 2E shows the calipering tool C of the present invention in a cocked or retracted position. The second configuration (not shown) is wherein the calipering tool C is in an operational position released from the cocked or retracted position. The third configuration is a result of the driving clutch 297 being manually manipulated to permit the chart 118 to be moved upwardly or downwardly as may be desired.

Considering the first relative position of parts in the cocked or retracted configuration, the drive rod 136 and sleeve 256 are in a lowermost position with the tab 256c in engagement with notched section 260b of sleeve 260. The sleeve 260 is pinned by pins 260a to drive tube 134. The drive tube 134 is pinned by pins 258a to sleeve 258 which contains a suitable J-slot 258c for receiving and holding cross pin 262 mounted with release rod 86. In this position (FIG. 2D) release rod 86 threadedly engages locking rings 88, 90 which combine to hold retaining collar 84 under feelers 80, with the contacting surfaces 80c, 84a and retaining feelers 80 in a cocked or retracted position.

Considering the second relative position as more fully discussed hereinbelow, when the calipering tool C of the present invention is lowered into the pipe P and the latch mechanism L (FIG. 2I) has been released, the drive wheel 158 engages the pipe P such that upward movement of the calipering tool C causes the drive wheel 158 to rotate resulting ultimately in rotation of rod 136. Rotation of the rod 136 results in rotation of sleeve 256 which engages sleeve 260 which in turn causes rotation of the drive tube 134 and sleeve 258. The rotation of the J-slot 258c of sleeve 258, releases the cross pin 262 from J-slot 258c permitting release rod 86 to move upwardly in response to the resilient urging of spring 92. The retaining collar 84 moves upwardly with the release rod 86 and out of contact with the feeler means F, allowing the feeler means F to move outwardly in response to urging of transmitting arms 94 into contact with the internal surface of the tubular member 18. Upward movement of the release rod 86 also removes the restraining action on end 136b of drive rod 136, which then is forced upwardly by action of spring 139 until the driving tab 256b of sleeve 256 engages V-notch 258b of sleeve 258. Continued rotation of driving rod 136 causes the drive tube 134 and chart 118 to rotate for recording purposes. The sloping sides of tab 256b and receiving slot 258b permits slippage therebetween should any rotational part be restrained from its rotation before damage can occur.

A third position of driving sleeve 256 is provided to permit manual movement of the chart 118 upwardly or downwardly as desired for protecting the scribing surface 118b of the chart 118 during assembly or disassembly. As best seen in FIGS. 2C, 2D, before centralizing section 28 is assembled onto body section 30 or has been disassembled therefrom, the insertion of an appropriate tool such as a screwdriver 99 (FIG. 2C) shown in phantom or the like through the bore 30c permits engagement with the slot 86a and thereafter pressing downwardly thereon until cross pin 262 is partially engaged in J-slot 258c, further causing disengagement of the sleeve 256 with sleeves 258 and 260. The J-slot of 258c permits the depressing tool to rotate release rod 86 and drive tube 134 and so cause the chart 118 to move downwardly within the protection of internally threaded sleeve 146 or upwardly to its starting position or for removal.

The drive wheel 158 is maintained in a retracted or inactive position (FIG. 2H) so that the wheel 158 does not project beyond the body B by means of holding pin 264 which is slidably mounted in the latch member housing 34g of body section 34 of body B in any suitable manner for longitudinal movement relative thereto. The holding pin 264 is held in an upward position as is shown in FIG. 2I by the latch mechanism L of the present invention, which is hereinafter described. A spring 266 is mounted around the pin 264 and rests upon collar 268 which is secured to holding pin 264 by pin 270 while the upper end of the spring 266 engages a plug 272 which is threadedly received in latch member housing 34g. The spring 266 acts to urge the collar 268 and holding pin 264 downwardly. The upper end 264a (FIG. 2H) of holding pin 264 engages the lower end 274a of shaft housing 274 while the lower end 264b of the holding pin 264 is engagement with latch arm 276 adjacent the upper end 276a thereof. The latch arm 276 is mounted for movement with the body section 34 of the body B such that it may pivot about pivot pin 276b within radial slot 34i formed in latch member housing 34g. The latch arm 276 is preferably held in a substantially upright position by shear pin 278 which extends through the latch arm 276 and through the wall of the body section 34 of the body B therewith. As long as the latch arm 276 is in a substantially upright position in engagement with the lower end 264b of holding pin 264, the spring 266 is under compression and the pin 264 is held against downward movement by the latch arm 276.

A lateral releasing dog 280 which includes an elongated slot 280a is mounted within radial slot 34i on a pivot pin 282 such that the pivot pin 282 extends through the elongated slot 280a of the lateral releasing dog 280. Such a mounting configuration allows pivoting as well as radial action of the lateral releasing dog 280 with respect to the body section 34 of the body B of the calipering tool C of the present invention. A spring 284 connects with the lateral releasing dog 280 at pin 280b and with the latch member housing 34g of the body section 34 by fastener 286. As the calipering tool C is lowered into the pipe P, the spring 284 is in a position more extended than shown in FIG. 2I with the lateral releasing dog 280 having its curved surface 280c and tip 280d in a more vertical orientation. The spring tension from the spring 284 is not sufficient, however, to move the latch arm 276 to the right as viewed in FIG. 2I. As the calipering tool C is forced into the well, the curved surface 280c rides on the interior surface of the tubular member 18 and is allowed to encounter variations in the pipe P and the release dog 280 rotates freely upwardly without affecting the position of the latch arm 276. When it is desired to release the latch arm 276, the calipering tool C of the present invention is forced upwardly within the tubular member 18 so that the tip 280d and surface 280e of the releasing dog 280 is allowed to enter a collar cavity (not shown) and engage the end of one of the pipes P being connected by the collar (not shown) to allow counterclockwise movement of the releasing dog 280 about the pivot pin 282. Such movement imparts a force in the right hand direction to latch arm 276 (as viewed in FIG. 2I) because the surface 280f acts against the latch arm surface 276c and moves such in an arc which extends to the right of the substantially vertical position shown in FIG. 2I. In that manner, the shear pin 278 is severed and the latch arm 276 is moved to the right sufficiently so that the spring 266 moves the holding pin 264 downwardly and the outer annular surface of the holding pin 264 is cleared by surface 276d of the latch arm 276 adjacent the upper arm 276a thereof. Movement of the holding pin 264 permits movement of shaft housing 274 in a leftward direction as viewed in FIG. 2H in response to resilient urging of spring 288, which is mounted with shaft support member 34n by suitable fastener 290, and the action of the spring 288 upon the exterior surface 274b of shaft housing 274. As seen in FIG. 3, the shaft housing 274 is mounted with the shaft support member 34n by a suitable pin 292. The pin 292 is adapted to be inserted through clevis 274c formed with shaft housing 274 having bushings 274d, 274e formed therewith and suitable bushing 294 mounted with shaft support member 34n.

It will be appreciated that rotation of the universal joint 168 may be accomplished manually by using a suitable tool (not shown) that is adapted to engage driving clutch 297 which includes an alignment pin 296 (FIG. 2H) and bevel gear 298, to result in rotation of the universal joint 168, shaft 174 and other assemblies described hereinabove. The alignment pin 296 provides a positioning member for the tool used to rotate the bevel gear 298 of the driving clutch 297. Rotation of gear 298 bypasses the one-way clutch 166 and permits rotation of the rod 136.

The calipering tool C of the present invention further includes a stylus assembly designated generally as Y which is adapted to be removably mounted with body section 30 of the body B and includes structure shown in FIGS. 2D, 2E including the transmitting arms 94, stylus tube 104, stylus tube extension 106, resilient ring 102, bolts 108, active stylii 116, pins 110, adjusting blocks 112, fastening means 114, sleeve 120, finger case 122 and retractor sleeve 126. The entire stylus assembly Y is adapted to be removed from the calipering tool C of the present invention and shipped apart from the calipering tool C. Moreover, this stylus assembly Y can be adjusted for the proper alignment and positioning of the stylus points 116d as a unit and will retain its proper adjustment regardless of which caliper body B it is made apart thereof. This is significantly different from calipering tools of the past in that if adjustment and/or repair were necessary, the entire calipering unit C had to be removed from the well and shipped as a unit for repair or adjustment thereof. However, the calipering tool C of the present invention is adapted to be removed from the pipe P, partially disassembled and have the stylus assembly Y removed intact as a unit and replaced with a spare stylus assembly Y, and put back into service immediately without the loss of time whereinafter the damaged stylus assembly Y can be appropriately repaired and readjusted without requiring replacement of the other components of the calipering tool C of the present invention.

In the operation or use of the calipering tool of C of the present invention, the calipering tool is placed within the well tubing or pipe P or other device to be calipered, with the wheel 158 in a retracted position as shown in FIG. 2H and with the feeler means F in the retracted position shown in FIG. 2D. The upper portion of the well tubing or pipe P is sealed off and an appropriate high pressure source, not shown, is affixed thereto for providing fluid pressure to act upon the calipering tool C. The fluid pressure medium may be water, oil, mud or any other suitable medium for pressurizing and forcing the calipering tool C of the present invention through the well tubing or pipe P. As pressure is increased to an amount that must exceed the well pressure, typically several hundred pounds in excess of well pressure, the fluid is forced about and between the upper fluid pressure retainer 60 (FIG. 2A) about an annulus formed between the calipering tool C and the well tubing or pipe P, through openings 62d, 64d, 66d in centralizers 62, 64, 66, respectively, until such pressure acts upon upper end surface 56d of lower fluid pressure retainer 56. The pressurized medium acting upon the end surface 56d and annular wipers or rings 56c of the lower fluid pressure retainer 56 results in a sealable relation being maintained between the lower fluid pressure retainer 56 and the inner surface of the tubular member 18. By increasing the pressure on the upper end surface 56d in excess of well pressure, the lower fluid pressure retainer 56 is maintained in a sealable relation with the tubular member 18 and provides the necessary sealable relation for forcing the calipering tool C thereinto the well tubing or pipe P. The pipe P may be curved as at section 18a (FIG. 1) thus affecting a change in direction from a substantially vertical orientation of the calipering tool within the tubular member 18 to that of a substantially horizontally one in section 18b and thereafter necessarily traversing through a looped section 18c affixed to subsurface valving arrangement 20 and thereafter into vertical section 18d within bore hole 24 in casing 22.

Heretofore, so far as known calipering tools of the prior art have been unable to traverse the curved and looped sections and must have been limited necessarily to substantially straight portions of pipe. However, because of the articulating means A of the calipering tool C of the present invention, the calipering tool C is able to bend, flex and/or articulate in such a fashion that the curved and/or looped portions of the well tubing or pipe P may be traversed by the calipering tool C as it is being forced by fluid pressure thereinto the tubular member 18. The centralizer 62, 64, 66 helps to maintain the calipering tool C in proper orientation within the pipe P even though a curved or loop section is encountered as the calipering tool C is forced thereunto the tubular member 18. The calipering tool C is pumped into the tubular member until the calipering tool C has reached the lowest level at which the calipering is to begin. It should be noted that the tabs 36k of no-go member 36d of body section 36 is capable of contacting a suitable restriction (not shown) in the bottom of the tubular member 18 to prevent the calipering tool C from going out the bottom thereof.

Once the calipering tool is in the proper position within the tubular member 18 fluid pressure on the lower fluid pressure retainer 56 is removed. Fluid pressure then is forced to act upon lower end surface 60d of upper fluid pressure retainer 60 for forcing the calipering tool C upwardly within the tubular member 18. Such fluid pressure may be achieved by utilizing a second pipe string adjacent thereto for back pressuring the pipe P or alternatively, the annulus between the outer surface of the tubular member 18 and the inner surface of the casing 22 may be used for providing suitable pressure about the tubular member 18, to the bottom thereof, and thereinafter for forcing such fluid upwardly into tubular member 18 for pumping the calipering tool C upwardly therein. As the calipering tool C is moved upwardly within the tubular member 18 because of the sealable relation between the upper fluid pressure retainer 60 and the tubular member 18, the latch on 276 is released by the lateral releasing dog 280 engaging the end of one section of pipe P in a collar cavity (not shown) of the tubular member 18. The movement of the latch arm 276 allows the pin 264 to move downwardly from the position shown in FIGS. 2H, 2I to a position where the drive wheel 158 is permitted to move outwardly in response to action of spring 288 acting on shaft housing 274. Upward movement of the calipering tool C then causes drive wheel 158 to rotate in engagement with the interior surface of the tubular member 18 to impart a rotation to stub shaft 164 as previously explained. The rotation of shaft 164 allows drive rod 136 to rotate in such a fashion that pin 262 is released from J-slot 258c so that the release rod 86 is moved upwardly by action of spring 92. Such upward movement of the release rod 86 affects the release of the feeler means F into engagement with the inside of the pipe P, since the retaining collar 84 is moved upwardly and out of engagement with the surfaces 80c of the feelers 80.

Normally at the beginning of the calipering operation the chart 118 would be positioned extended from the internally threaded sleeve 146 as shown in FIG. 2E and as the drive wheel 158 is moved in engagement with the pipe P by upward pressurized movement of the calipering tool C in the pipe P, the drive tube 134 imparts rotation to the chart 118 so that the chart 118 travels helically or spirally downwardly in body section 30 of the body B of the calipering tool C. The stylus points 116d are in engagement with the chart 118 to mark the surface of the chart 118 with trace lines corresponding to each active stylus 116. If any irregularities in the internal surface of the tubular member 18 are encountered by any of the feelers 80 of the calipering tool C as it is pumped upwardly within the tubular member 18, the normally smooth helical or spiral line traced by the active stylus 116 will vary in accordance with the size of the variation to indicate such surface variation at the point encountered by the feeler means F. In such manner, an accurate indication as to the condition of the surface of the inside of the tubular member 18 is obtained and recorded on the chart 118. Continued fluid pressure upon the lower end surface 60d of the upper fluid pressure retainer 60 results in continued calipering of the inside diameter of the tubular member 18 until such time that the annular nut 132 is threaded into engagement with surface 146c of threaded sleeve 146 whereinafter continued rotation of the drive wheel 158 does not continue to rotate the chart 118 due to the clutch effect occurring between the pointed section 256b of sleeve 256 slipping out of engagement with the notch 258b of sleeve 258, thus preventing damage to any of the operative elements thereof. Thereafter the calipering tool C of the present invention is pumped out from the pipe P by continued pressure acting upon upper fluid pressure retainer 60, with the calipering tool C capable of being forced by such fluid pressure through the subsurface valving arrangement 20, looped section 18c, horizontal section 18b and curved section 18a of the tubular member 18 until such may be removed at the upper surface 10a of platform 10. Prior to the removal of the chart 118 from the body section 30, the sleeve 126 can be moved into contact with the engaging portions 120c of sleeve 120 to retract the active styli 116 from the chart 118. It will be understood that for each run of the calipering tool C in a pipe P, it will require a new chart 118 and for that purpose, the charts 118 are replaceable.

It will be appreciated that the centralizers 62, 64, 66 insure that the body sections 28, 30, 32 are in proper axial alignment with the longitudinal axis of the tubular member 18 during calipering operations, with centralizer 62 being above and centralizer 64 being below body section 30 for insuring proper centralized operation of the calipering tool C. Such centralizers 62, 64, 66 are particularily important, otherwise offcenter movement of feeler body 30 will be reflected in the chart recordings and will have to be compensated for when the charts are read.

Thus, the calipering tool C of the present invention provides a new, useful calipering tool C that is capable of being pumped down into a pipe P under the influence of a pressurized medium and pumped outwardly therefrom. Furthermore, the calipering tool C of the present invention is capable of articulated movement by means of the articulation means A therewith for permitting flexing and/or articulation of the body B of the calipering tool as it is pumped through curved and/or looped sections of pipe P. Still further, the calipering tool C of the present invention provides a replaceable stylus assembly Y which may be removed from the calipering tool C and repaired without requiring removal and repair of the entire calipering tool C. It should be understood that the calipering tool C of this invention may be used for calipering operations on surfaces other than a pipe P and therefore, even though the invention is described for use in a pipe P, the use of the invention is not limited thereto.

The foregoing disclosure and description of the invention is illustrative and explanatory thereof and various changes in the size, shape and materials as well as in the details of the illustrated construction, may be made within the scope of the appended claims without departing from the spirit of the invention.

We claim:

1. In a calipering tool for use in a pipe and having a body and feeler means with the body for engaging the internal surface of the pipe being calipered, the feeler means for moving in response to variations in the surface of the pipe, the improvement residing in the body being formed of multiple body sections, the body having means therewith for permitting the body to be pumped in response to fluid pressure thereon into the pipe for operation thereof; the body having articulating means with the body sections for permitting the body sections to articulate with respect to each other as the body sections pass through a curved section of the pipe.

2. The structure of claim 1, wherein said means includes:
   fluid pressure retaining means mounted with the body for maintaining the body in a sealable relation with the pipe to permit movement of the body along the pipe, as desired, in response to fluid pressure acting upon said fluid pressure retaining means.

3. The structure of claim 2, wherein said fluid pressure retaining means includes:
   lower fluid pressure retainer with the body for maintaining the body in sealable relation to the pipe to permit movement of the body into the pipe in response to fluid pressure, as desired.

4. The structure of claim 2, wherein said fluid pressure retaining means includes:
   an upper fluid pressure retainer with the body for maintaining the body in sealable relation to the pipe to permit movement of the body out from the pipe in response to fluid pressure, as desired.

5. The structure of claim 2 wherein said fluid pressure retainer means includes a body section having a locomotive section therewith.

6. The structure of claim 1, wherein said articulating means includes at least one ball and socket joint between adjacent body sections.

7. The structure of claim 6, wherein said ball and socket joint is disposed between each of the multiple body sections for affixing the body sections together for articulated movement.

8. The structure of claim 7, further including:
   anti-rotation means with selected of said ball and socket joints to prevent relative rotation of adjacent body sections with respect to each other.

9. The structure of claim 6, wherein at least one of said body sections contains centralizing means therewith to keep the body in a centralized operating position.

10. The structure of claim 9, wherein said centralizing means permits transit of said body sections through curved portions of pipe being calipered.

11. The structure of claim 6, wherein at least one body section includes limiting means for limiting downward movement thereof in the pipe.

12. The structure of claim 1, wherein the calipering tool includes a chart for recording variations in the surface of the pipe detected by the feeler means, further including:
   flexible drive shaft means mounted through the body sections and said articulating means for driving the chart.

13. The structure of claim 12 wherein the calipering tool has drive means with the body for driving the chart, further including the flexible drive shaft being in operative engagement with the drive means and the chart.

14. The structure of claim 12, wherein said flexible drive shaft means includes:
   a flexible drive shaft mounted within the body section to permit the transfer of torque during non-aligned movement between adjacent body members.

15. The structure of claim 14, wherein said drive shaft includes a plurality of flexible drive shaft sections having socket means therewith for permitting the transfer of rotation of said drive shaft sections while permitting relative axial movement between said drive shaft sections.

16. The structure of claim 11, wherein feeler means is movable between a retracted position not in engagement with the pipe surface and a released position in engagement with the pipe surface.

17. The structure of claim 16, including the further improvement residing in a drive means for driving the chart, said drive means including a drive tube, a drive rod mounted for movement in said driving tube, and clutch means with said drive tube and said drive rod permitting movement of the feeler means between the retracted and released positions.

18. The structure of claim 16, wherein said clutch means includes a first sleeve mounted about said drive rod and with said drive tube, a second sleeve mounted with said drive rod within said drive tube for movement therein, said second sleeve adapted to engage said first sleeve for rotation thereof.

19. The structure of claim 18, wherein said clutch means includes a third sleeve mounted with said drive tube and for receiving therein a portion of said drive rod and a portion of a release rod, said release rod for releasing the feeler means from the retracted position to the released position, said third sleeve adapted to be operatively engaged by said second sleeve for movement of said release rod for releasing the feeler means.

20. The structure of claim 16, wherein said release rod has a release pin mounted therewith and said third sleeve is formed having a J-slot therewith, said release pin adapted to be movably disposed within said J-slot.

21. The structure of claim 19, wherein said second sleeve is adapted to rotate said third sleeve after releasing the feeler means.

22. The structure of claim 21, wherein said second sleeve can be moved out of driving engagement with said first sleeve and said third sleeve and the chart is manually movable.

23. The structure of claim 22, wherein a tool is adapted to engage and depress said second sleeve to move said second sleeve out of engagement with said first sleeve and said third sleeve and to rotate the chart as desired.

24. The structure of claim 23, wherein the chart may be manually retracted within a sleeve for protection during assembly and disassembly.

25. The structure of claim 23, wherein the chart is adapted to be manually extended from a protected position to an operative position.

26. The structure of claim 21, wherein:
said third sleeve is formed having a notch with sloping sides; and
said second sleeve is formed having a V-shaped tab adapted to engage said notch permitting disengagement between said notch and said tab while driving the calipering tool.

27. The structure of claim 1, further including a stylus assembly removably mounted with the body.

28. The structure of claim 27, wherein said stylus assembly including a plurality of stylus members for providing trace lines indicating variations in response to detection of internal surface variations of the pipe by the feeler means.

29. The structure of claim 28, wherein said stylus assembly further includes transmitting means adapted to engage the feeler means and transmit movement thereof to a portion of said stylus members.

30. The structure of claim 27, wherein said stylus assembly is adjustable independent from the body of the calipering tool.

31. The structure of claim 30, wherein said adjusted stylus assembly is adapted to be used in any body of the calipering tool and remain in calibration.

32. The structure of claim 31, further including a retractor sleeve for engaging each of said stylus members to permit mounting of said stylus assembly with the body without damaging said stylus members and preventing said stylus members fom coming into contact with the chart previously assembled in the body.

33. The structure of claim 1 wherein the calipering tool has a chart mounted in the body for recording variations in the surface of the pipe detected by the feeler means and drive means with the body for driving the chart, including:
the body having the drive means in one body section and the feeler means in another body section.

* * * * *